No. 693,472. Patented Feb. 18, 1902.
G. T. WARWICK.
COASTER AND BRAKE MECHANISM FOR CYCLES.
(Application filed May 21, 1900.)
(No Model.) 2 Sheets—Sheet 1.

Witnesses: J. D. Garfield, J. C. Carrigan

Inventor, George T. Warwick, by Wm. S. Bellows, Attorney.

No. 693,472. Patented Feb. 18, 1902.
G. T. WARWICK.
COASTER AND BRAKE MECHANISM FOR CYCLES.
(Application filed May 21, 1900.)
(No Model.) 2 Sheets—Sheet 2.
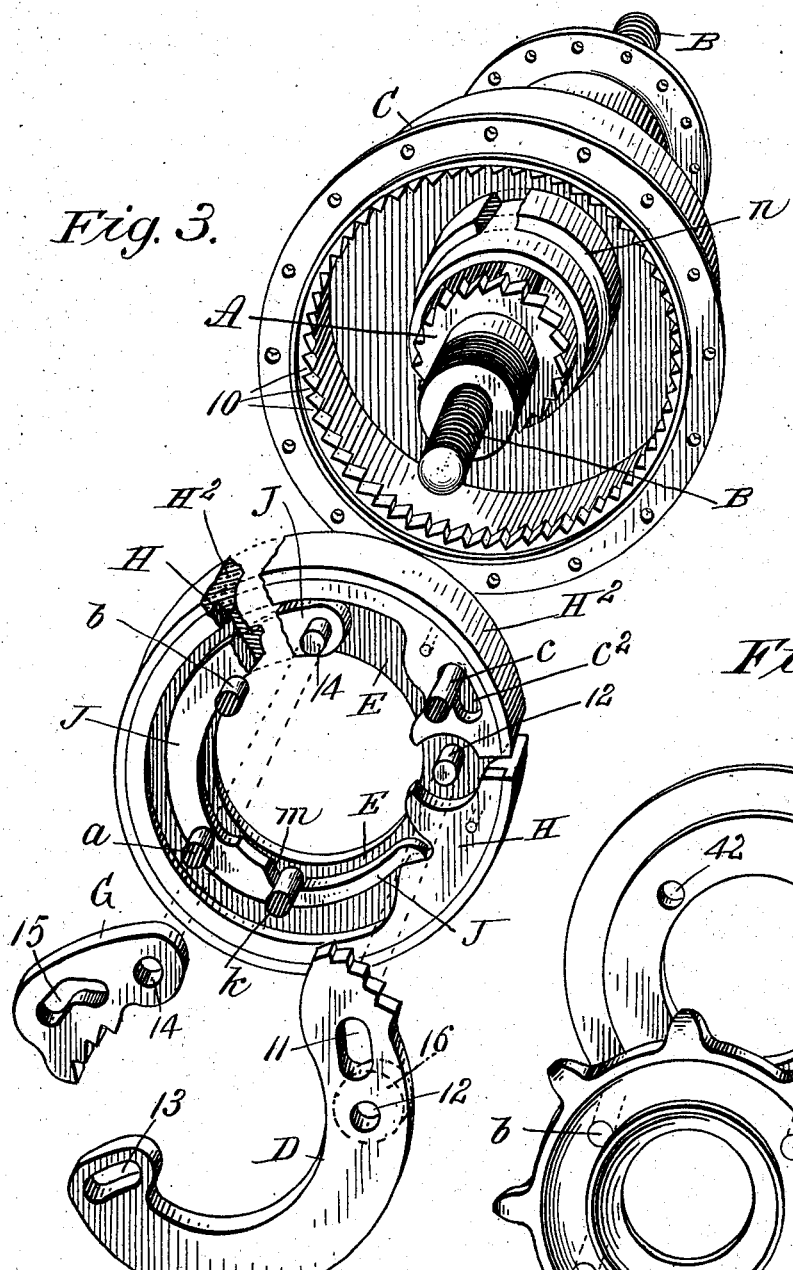
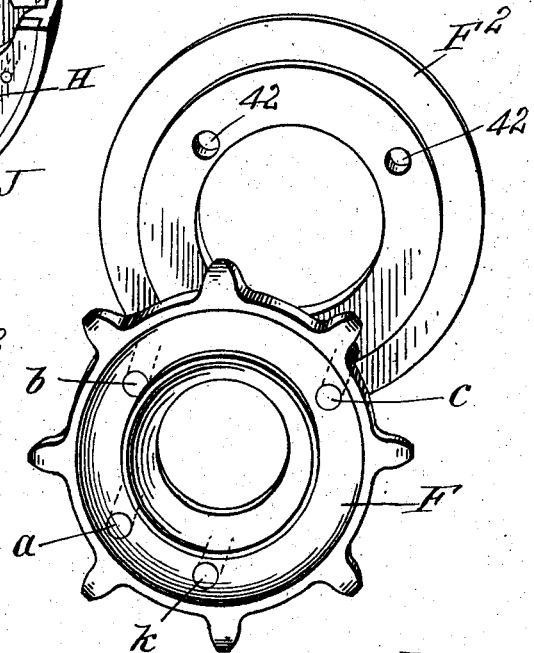

UNITED STATES PATENT OFFICE.

GEORGE T. WARWICK, OF SPRINGFIELD, MASSACHUSETTS, ASSIGNOR OF ONE-HALF TO GEORGE M. HENDEE, OF SPRINGFIELD, MASSACHUSETTS.

COASTER AND BRAKE MECHANISM FOR CYCLES.

SPECIFICATION forming part of Letters Patent No. 693,472, dated February 18, 1902.

Application filed May 21, 1900. Serial No. 17,355. (No model.)

*To all whom it may concern:*

Be it known that I, GEORGE T. WARWICK, a subject of the Queen of Great Britain, and a resident of Springfield, in the county of Hampden and State of Massachusetts, have invented certain new and useful Improvements in Coaster and Brake Mechanism for Cycles, of which the following is a full, clear, and exact description.

This invention relates to improvements in what is termed a "coaster and brake" for cycles, more particularly for bicycles.

The object of this invention is to provide a novel and practical mechanism for application or interposition between the power element or driver of the vehicle and the wheel or rotary part to be driven, which is at the pleasure and according to the mode of action of the rider in substance a clutch, whereby by pedaling the mechanism serves as a means for placing the driving element in driving connection with the part to be driven, whereby by a mere cessation of the driving force by the rider the aforesaid clutch-like connection becomes disengaged, so that the wheel, which had been theretofore positively driven, may run or "coast" without being obstructed, and whereby by the exertion of force or back thrust on or transmitted to the driving element the latter not only will remain out of driving connection with the wheel to be driven, but there will be exerted on the wheel to be driven a braking or retarding pressure.

To these ends the invention consists in combinations and arrangements of mechanisms and of parts and in the construction of certain of the parts, all substantially as will hereinafter be fully described, and set forth in the claims.

The improved coaster-brake mechanism is illustrated in the accompanying drawings as designed for application within and adjacent the annular rim or cup-like end of the rear wheel (which is the driven wheel) for a bicycle, and in said drawings—

Figure 1:
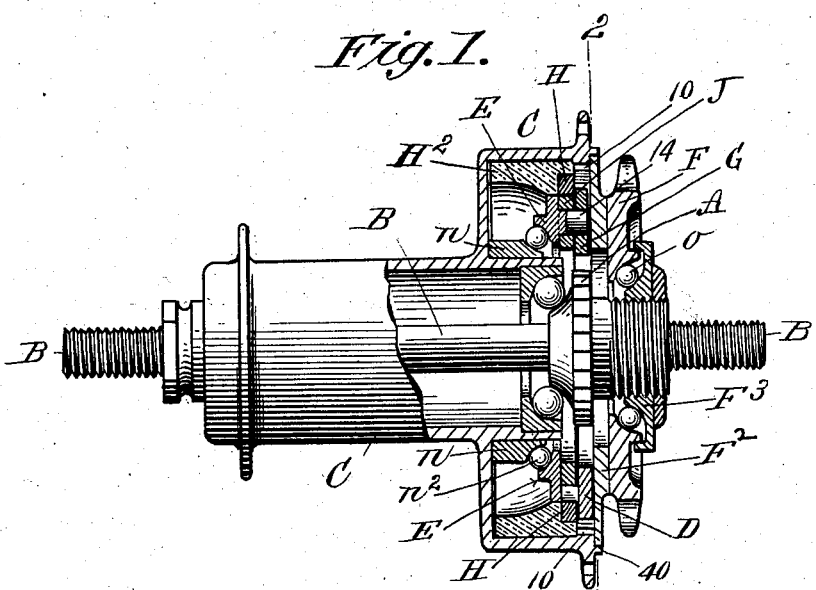
Figure 2:
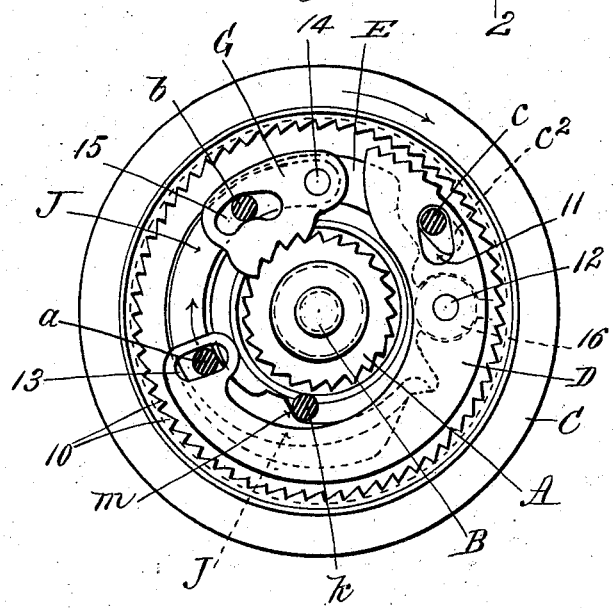

Figure 1 is a side and sectional view centrally of the stationary rear-wheel axle and part of the rear-wheel hub through the cupped end of the hub and the sprocket-wheel and through the parts comprised in the novel coaster and brake mechanism. Fig. 2 is an end view of the parts as seen at the left of the plane indicated by the section-line 2 2, Fig. 1, the four circular parts shown in cross-section being understood as studs, which are carried by and are fixtures of the sprocket-wheel. Figs. 3 and 4 are perspective representations of the rear-wheel hub and several parts which are comprised in the novel mechanism shown as in more or less separated relations, Fig. 4 indicating a preferred two-part construction of interchangeable sprocket-wheel.

Similar characters of reference indicate corresponding parts in all the views.

The fixed rear-wheel axle B, which is understood as being clamped or adapted to be clamped in the fork, has the fixed edgewise-serrated wheel A thereon, and around said fixed axle rotates the rear-wheel hub C, which has in the cap-like end portion thereof interval serrations 10. D represents a swinging pawl intermediately pivotally mounted at 12 on a ring E, which is loosely fitted in the cup-like wheel-hub C and on which ring other parts of the device are supported.

F represents the sprocket-wheel, and $F^2$ a plate or section, which to all intents and purposes is regarded as a part or fixture thereof and which has a stud $a$ engaging in the apertured end 13 of the swinging pawl D, so that when the driving rotations are imparted to the sprocket-wheel in the usual way the said pawl must engage the serrated internal rim of the wheel-hub and the rear wheel through its hub must therefore be driven.

When the driving pressure on the pedals is discontinued, so that the rear-wheel hub has the tendency to "run ahead" of the crank-shaft by its momentum, the relatively back action or stress of the sprocket through its said stud $a$ will throw the toothed pawl out from engagement with the hub, and the pedals now will not turn; but the mechanism becomes a "free coaster," the supporting-ring E and all its equipments remaining stationary while the rear-wheel hub runs. That the said ring remains stationary while "coasting free" is insured by the fact that the sprocket-wheel F has a lost motion when the driving pressure at the pedals is discontinued—that is, a limited rotational movement relatively to and independently of the support F and the devices thereon mounted—and its stud $b$ swings the sector lever or dog G into engagement with the toothed wheel A on the axle, which is a fixture thereon. Said part G is mounted on the pivot-stud 14 of the supporting-ring E and has the cam-slot 15, in which the stud enters and on the edges of which it impinges.

H represents the split back-pedaling brake-ring, comprising the metallic section and the bearing-section $H^2$, which may be hardened fiber, wood leather, or the like, and the said ring is held by an abutment 16 between its ends and expanded by a back pressure on the pedals through a correspondingly-reversed pressure being exerted on the sprocket-wheel through the stud $c$, fixed on and projecting from the sprocket-wheel working in end of the slot $c^2$ in the split ring.

Now after having either back-pedaled to brake or run free, coasting, or both, and it is desired to forcibly propel the cycle the forcible forward pedaling caused the sprocket-wheel F to carry the dog G out of its engagement with the serrated wheel A, and said sprocket will throw the driving-pawl D into connection with the serrated wheel-hub rim; but to insure that the action of the sprocket-wheel F through its stud $a$ on the pawl D will be a swinging one on the pawl, the latter moving on its pivot 12 and so that it cannot idly rove around with the ring E within the hub-rim and independently of the latter, provision is made that before the time the sector or dog G moves out from its engagement with the rim of the hub and the pawl D moves into its engagement with wheel-hub C the ring will be, through the brake-ring, bound to the hub, which provision for such action is by means of the spring J, which is anchored to the ring E, preferably on the aforementioned pivot-stud 14. The stud $k$ on the sprocket-wheel F, working against cam-surface $m$ on the spring J, crowds the spring out against the expansion-ring H and binds it frictionally against the internal surface of the annular rim of the wheel-hub. In this mechanism I preferably provide three sets of ball-bearings—viz., those as usually provided between the cones on the axle and the ball-race within the hub, those $n^2$ between the cone $n$, provided to the rear-wheel hub and the support-ring E, and those indicated at $o$ between the sprocket-wheel F and the cone $F^3$, affixed on the threaded portion of the axle outside of the sprocket-wheel. Inasmuch as the part $F^2$ may be of the proper diameter to serve as a closing and dust-excluding plate for application at the end of the opening within the cup-shaped hub, it setting against the shoulder 40 therefor and for the reason that it is commonly desirable to interchange a sprocket-wheel for a chain of gearing, I have constructed the sprocket-wheel and plate separately, the studs aforementioned and designated by the reference-letters $a$, $b$, $c$, and $k$ fitting through matching perforations 42 in the plate-like section $F^2$ for application next within the sprocket-wheel, said studs projecting inwardly beyond the inner face of said part $F^2$ to reach and operate the pawl or clutching device D, the dog G, the brake H, and the interposed device or spring J. The pin or stud $c$ in order to reach and operate marginally in the slot $c^2$ of the brake-ring reaches its engagement therein through a slot 11, near the end of the part D. One and the same stud 14 serves as a means of pivotally mounting both the dog G and the spring J on the bearing-ring E.

Although it will be perceived that the sprocket-wheel F is loosely mounted about the axle and is unaffixed to the hub and is movable relatively to the latter, its extent of rotational movement in a forward direction relatively to the hub comprises but a comparatively small part of a circle and may be regarded as a "lost motion," for, assuming conditions are established for free coasting and pressure is applied forcibly forward as the pedals of the cycle, and consequently to the sprocket-wheel, only a short extent of relative motion of the sprocket can ensue before through the medium of the pawl the sprocket and hub are found as one and must move in unison; but so, on the other hand, when the pedaling or propulsive force is discontinued so that the pawl becomes disengaged from the hub the sprocket-wheel need not turn, but may remain immovable while the wheel which had been driven runs free or coasts, and again when the braking-pressure is accomplished it is not by a back-pedaling pressure for effect against a rotating sprocket wheel or driver, but it is merely by a thrust or crowding in the reverse directions from the line of propulsive force, which is maintained so long as occasion for braking continues.

Having now described my invention, what I claim, and desire to secure by Letters Patent, is—

1. In a driving mechanism for a bicycle or other vehicle, in combination, a rotary driver, as a sprocket-wheel, the hub of the wheel to be driven, and a fixed axle about which the driven wheel turns, a support-ring normally free or disconnected from the axle and from the wheel-hub, a clutch part pivotally mounted on said ring, engaged and actuated by the sprocket-wheel, whereby a propulsive force on the driver-sprocket establishes and maintains a connection for power transmission through such engagement member between the sprocket or driver and the wheel to be driven.

2. In a driving and free-coaster mechanism for a bicycle or other vehicle, in combination, a rotary power element or driver, as a sprocket-wheel, a part to be rotatably driven, as the wheel-hub, and a fixed part or axle about which the latter turns, a supporting-ring normally free relatively to the axle and the driven wheel, the shiftable engagement member mounted on, and also having an independent movement relatively to, the ring, having a slot or recess between the opposite walls of which engage a projection which is on, and has a revoluble movement with, the driver-sprocket, for the purpose set forth.

3. In a driving mechanism for a bicycle, or other vehicle, in combination, a rotary power element, or driver-sprocket, the wheel to be rotatably driven, having a flanged internally-toothed hub, a fixed axle, about which the driven wheel turns, the supporting-ring, the pawl or engagement member mounted on the ring, and also having a movement independently relatively thereto, and provided with a toothed extremity, and a projection of the driver having an actuating engagement with the said pawl, for the purpose set forth.

4. In a driving free-coaster and brake mechanism for cycles, in combination, a wheel to be driven, an axle or fixed part about which it rotates, a rotatable driver, normally free relatively to the axle and the driven wheel, a braking device adapted to bind against the driven wheel, a supporting-ring located within the hub of the driven wheel, and normally free and disconnected from the axle and the said driven wheel, a shiftable engagement member mounted on and also movable relatively to said supporting element and engaged and controlled by the driving element for connecting the driving to the driven wheel, on a forward pressure of the driver, and for insuring a release of such connection on a release of the propulsive force on the driver, means controlled by the driver at the cessation of its propulsive force for locking the supporting element to the axle, and a part carried by the driver for forcing, on a reversed thrust imparted thereto, the braking device into engagement with the driven wheel, as set forth.

5. In a mechanism of the character described, the combination with the fixed axle, the wheel-hub rotatable thereabout, and the sprocket-wheel, loosely rotatably mounted relatively to the axle and unaffixed to the hub, a hub-engagement member, and the supporting-ring E therefor, located within the hub of the driven wheel, and normally loose relatively to both the said hub and the axle, on which said engagement member has a connection, and relatively to which it has a motion to engage and disengage the hub, and means for causing an engagement between the driving-wheel and said hub-engaging member, whereby such member serves as a connecting medium between the driven wheel and the hub, and whereby the said support necessarily turns in unison therewith.

6. In a mechanism of the character described, in combination, a rotary driver, a wheel to be driven, an axle about which it turns, the driver being normally free relatively to both the driven wheel and axle, a supporting member E unattached to the driven wheel and axle, a pawl mounted on said support member and having an independent movement relatively thereto and adapted to engage and disengage the driven wheel, a part on the driver, engaging and actuating the pawl, a dog mounted on, and movable relatively to, said support member E, with which part the rotary driver engages.

7. In a mechanism of the character described, in combination, a rotary driver, a wheel to be driven, an axle about which it turns, the driver being normally free relatively to both the driven wheel and axle, a supporting member E unattached to the driven wheel and axle, a pawl mounted on said support member and having an independent movement relatively thereto and adapted to engage and disengage the driven wheel, a part of the driver, engaging and actuating the pawl, a dog mounted on, and movable relatively to, said support member E, with which a part of the rotary driver engages for placing it while the driver is under a forward strain, out of engagement with the axle, and for insuring its axle engagement on the release of such driving force, a brake or binding device, having a part thereof connected to the support E, and a member of the rotary driver for engaging same and placing it in engagement with the driven wheel on a reversed thrust of the rotary driver.

8. In a mechanism of the character described, in combination, a fixed axle or wheel support, the wheel to be driven, rotatable thereabout, a rotary driver, a support member E unattached to the axle and the driven wheel, a pawl pivoted thereon and also movable relatively thereto, and engaged by a part of the rotary driver, means for locking said support against rotation on the release of the driving force of the rotary driver, a brake device also pivoted to the said support member and actuated by the rotary driver, and a secondary device actuated by the rotary driver at the initial part of its driving thrust for crowding the brake device which is connected to said support E in to bind with the driven wheel, whereby a certain resistant for the action of the pawl relatively to the support and the hub is acquired.

9. In a coaster and brake mechanism, in combination, a wheel-hub, and a driving wheel or sprocket mounted to rotate freely relatively to the hub, a support-ring freely mounted adjacent the hub, a brake-ring adapted for expansion mounted on said supporting-ring, an abutment for constituting a resistance between a portion of the brake-ring and the support-ring, a device actuated by the forward pressure of the driver mounted on the support-ring, for engaging the driver and hub, and a part of the driver arranged relatively to the brake-ring, and adapted to operate on a reversed motion of the driver-wheel relatively to the hub to expand the brake-ring.

10. In a mechanism of the character described, the combination with the axle, the hub of the driven wheel rotatable thereabout, and provided with the internal series of teeth 10, and the sprocket-wheel loosely mounted relatively to the axle and the hub, the support-ring E, the pawl or engagement member D pivotally mounted for swinging movement on the support-ring and also movable bodily in unison with the ring, and having in one member thereof the slot or recess 13, and having its other member toothed, or serrated, as shown, a stud $a$ projecting from the sprocket-wheel and engaging in said recess and operating by the motions of the sprocket-wheel to cause the engagement and disengagement of the pawl D.

11. In a mechanism of the character described, in combination, the axle B having the toothed wheel A fixed thereon, the hub of the wheel to be driven rotatable about the axle, the sprocket-wheel loosely mounted relatively to both, the axle and the hub, the support-ring E located adjacent and unattached to the hub and having the engagement member D mounted thereon and also having pivotally mounted thereon the swinging part, or dog, G provided with teeth and having the cam-slot 15, these studs $a$ and $b$ mounted on the sprocket-wheel and respectively engaging the pawl D and the cam-slotted dog G, the split brake-ring having a part thereof an anchorage or abutment against a projection of the supporting-ring, and a stud also mounted on the sprocket-wheel and operating against a portion of the brake-ring to expand the same on a reverse thrust being imparted to the sprocket-wheel, substantially as described.

12. In a coaster and brake mechanism for a cycle, in combination, the axle having the toothed portion A, the hub of the wheel to be driven rotatable about the axle, the sprocket-wheel A loosely mounted relatively to both the axle and hub and provided with the studs or extensions $a$, $b$, $c$, and $k$, the support-ring E having the pawl D pivotally mounted thereon and having the slot 13 in which engages said stud $a$, the engaging member or dog G pivotally mounted on the ring and having the cam-slot 15 in which engages said stud $b$, the brake-ring having a portion anchored to the ring and having an opposite portion engaged by said stud $c$, the spring J anchored to the ring, and having a portion thereof in engagement with the brake-ring and having a cam-surface $m$ with which engages the aforesaid stud $k$, all substantially as and for the purposes set forth.

13. In a coaster and brake mechanism for a cycle, in combination, the fixed axle 13 having the cone $F^3$ thereon, the hub of the wheel to be driven provided with the cup-shaped extremity provided therein with the cone $n$, the sprocket-wheel loosely mounted and having between it and the aforesaid cone $F^3$ a series of balls, the supporting-ring E mounted within the cup-shaped extremity of the hub and having between it and the aforesaid cone $n$ a series of balls, the pawl D and the dog G pivotally mounted on said support-ring, the brake-ring H having by a portion thereof a connection with said ring, and the spring J also mounted on the support-ring and having an engagement with the brake-ring, and the four actuating-studs $a$, $b$, $c$, and $k$ mounted on the sprocket-wheel and respectively engaging the pawl, dog, brake-ring, and spring, for the purposes set forth.

14. In a coaster and brake mechanism, for a cycle, in combination, the fixed shaft or axle B, the hub of the wheel to be driven mounted for rotation thereabout and provided with the cup-shaped end, constructed with teeth, the support-ring E located within said cup-shaped part of the hub and having mounted thereon a pawl movable in unison with the support-ring and also having a movement independently thereof to engage and disengage an internal part of the hub, a sprocket or driving wheel of the device loosely mounted relatively to the axle and the hub, and provided with the stud $a$ having an engagement with the said pawl, the plate or section $F^2$ having a perforation through which said stud engages and beyond which it presses said plate closing the opening within the cup-shaped end of the hub, substantially as described.

15. In a mechanism of the character described, in combination, the axle B, the hub having the cup-formed extremity, the support-ring E located within said extremity and normally movable relatively to the hub, the engaging member D mounted on the ring and having a movement of its own independently thereof, a device movably mounted on the ring and adapted to engage and disengage the axle, the expanding brake-ring which by portions thereof has an anchorage against the ring, and the spring J also having a part thereof engaged with the ring, the sprocket-wheel F loosely mounted relatively to the axle on the hub, having the four studs $a$, $b$, $c$, and $k$, the detachable section or plate $F^2$ located next within the sprocket serving to close the opening within the cupped end of the hub and having perforations 42 through which the aforesaid studs pass to their respective engagements with the said pawl, dog, or locking device, brake-ring, and spring, substantially as described.

16. In the mechanism herein described, in combination, the axle B, having as a fixture thereof the circularly-arranged series of teeth A, the hub of the wheel to be driven rotatable about the axle and provided with the cup-shaped extremity provided with internal teeth 10 and also the internally-located cone $n$, the support-ring E located within the cupped end of the hub between which and said cone $n$ are a series of balls, the pawl D having the pivot 12 connecting it and the support-ring and provided with the slot, 13, also constructed with the abutment-hub 16 concentric with said pivot 12, and having its engaging extremity formed with serrations, or teeth, the locking-dog G pivotally connected to the support-ring and having the cam-slot 15 and adapted to engage the said teeth A of the axle, the expanding brake-ring located within the cupped end of the hub, having one end thereof in abutment against said part 16 and having in another part thereof the slot $c^2$, the spring device J pivotally connected to the support-ring and provided with the cam-surface $m$, the sprocket-wheel loosely mounted to turn about the axle outside of and freely relatively to the hub and provided with the studs $a$, $b$, $c$, and $k$ arranged as described, for the purposes set forth.

Signed by me at Springfield, Massachusetts, this 27th day of April, 1900.

GEO. T. WARWICK.

Witnesses:
WM. S. BELLOWS,
GEO. M. HENDEE.